Patented Feb. 23, 1932

1,846,239

UNITED STATES PATENT OFFICE

WILLIAM D. WOLFE, OF AKRON, OHIO, ASSIGNOR TO THE GOODYEAR TIRE & RUBBER COMPANY, OF AKRON, OHIO, A CORPORATION OF OHIO

NONADHESIVE LINER AND METHOD OF MAKING IT

No Drawing.    Application filed February 17, 1930.   Serial No. 429,216.

This invention relates to the manipulation of relatively plastic adhesive sheets or bodies of unvulcanized rubber, and it has particular relation to methods of and means for storing such materials in stacked or superposed relation.

One object of the invention is to provide a new type of liner material to which the rubber does not readily adhere and which is highly flexible, durable and resistant to heat.

Another object of the invention is to provide a coated liner from which the coating material does not peel upon coming into contact with the rubber plies.

In the rubber industry, it is customary to store sheets of unvulcanized rubber or rubberized fabric in stacks, piles or rolls in which a liner of cloth or other suitable material is disposed between the adjacent rubberized surfaces in order to prevent adhesion therebetween. Adhesion between the rubber and the fabric liners is prevented by coating the surfaces of the liners with some composition such as nitrocellulose to which rubber does not readily adhere. Unfortunately, most of the coating compositions heretofore employed are either relatively stiff upon application or else they soon become so upon exposure to the action of heat transmitted from rubber compounds which have been freshly heated by the action of calender rolls. The coating compositions of such liners crack and check prematurely and, as a result, the compositions peel off and adhere to the surface of the rubber which the liners are designed to protect. This peeling of the liner coatings is very undesirable not only because it tends to render the liner unfit for further service but because the material adhering to the rubber surfaces tends to prevent proper adhesion between the various plies when the rubber is incorporated into articles in the ordinary processes of manufacture. Heretofore, much time and effort has been expended in an effort to develop an inexpensive material which would be substantially free from the above described defects. However, prior to the applicant's invention, no adequate solution of the problem had been found.

This invention consists in the discovery that a mixture of ordinary linseed, tung, or rapeseed oil, or other unsaturated vegetable drying oil of like character, and casein, or similar agglutinant, when properly applied to liner surfaces constitute excellent coating media which are substantially free from the difficulties heretofore encountered in connection with the coating compositions previously employed. Although the ingredients and proportions of the various ingredients entering into the coating compositions may be varied to a relatively wide degree, the following is a specific formula for a material which has been found by experience to give excellent results.

|  | Per cent |
|---|---|
| Red lead | 0.90 |
| Boiled linseed oil | 18.12 |
| Gasoline | 18.12 |
| Casein | 7.26 |
| Water | 53.18 |
| Ammonia water | 2.42 |

In the above described composition, the red lead acts merely as a drying agent to hasten the solidification of the linseed oil. The gasoline is not absolutely essential to the composition and may be omitted, if desired, without materially affecting the flexibility of the coating or the adhesion of the latter to the fabric to which the composition is applied. However, it is found materially to decrease the tendency of the coating material to adhere to highly plastic rubber. The linseed oil forms a part of the body of the coating ply and also acts as a plasticizer for the casein which forms an important part of the dried coating material. The casein is employed in the compound for purposes of emulsification of the linseed oil and also for purposes of binding the latter material more firmly to the fabric. It, in conjunction with the oil forms the body of the compound. Other convenient emulsants, such as glue, may be employed in lieu thereof, if desired. The ammonia water is added for purposes of dissolving the casein. The water serves as an economical and efficient dispersing agent for the remainder of the ingredients in the composition. A compound so prepared is quite fluid and may be applied to fabric in any convenient manner, for example, by spreading, spraying, dipping or by means of a brush. When so applied, the volatile components of the material soon evaporate leaving the linseed oil to oxidize and in conjunction with the casein to form a flexible durable and closely adhering film upon the surface of the fabric. Adhesion between this film and rubber is extremely slight. Also the film may be repeatedly wrinkled and creased without any material tendency to check or crack and for that reason, it may be used for long periods of time without any tendency of the material to loosen from the fabric and to adhere to the rubber surfaces to which the fabrics are applied.

Although I have described the preferred embodiments of the invention, it will be apparent to those skilled in the art that the invention is not so limited but that various modifications may be made therein without departing from the spirit of the invention or from the scope of the appended claims.

What I claim is:

1. A method of treating fabrics for use as liners upon surfaces of unvulcanized rubber which comprises applying thereto an emulsion of a vegetable drying oil and an agglutinant.

2. A method of treating fabrics for use as liners upon surfaces of unvulcanized rubber which comprises applying thereto a water emulsion of a vegetable drying oil and casein.

3. A method of treating fabrics for use as liners upon surfaces of unvulcanized rubber which comprises applying thereto an emulsion of linseed oil and an agglutinant.

4. A method of treating fabrics for use as liners upon surfaces of unvulcanized rubber which comprises applying thereto a water emulsion of linseed oil and casein.

5. A method of treating fabrics for use as liners upon surfaces of unvulcanized rubber which comprises applying thereto an emulsion containing casein, a plasticizing oil and gasoline.

6. A method of treating fabrics for use as liners upon surfaces of unvulcanized rubber which comprises applying thereto a water emulsion containing a vegetable drying oil and gasoline.

7. A method of treating fabrics for use as liners upon surfaces of unvulcanized rubber which comprises applying thereto an emulsion of linseed oil and casein.

8. A method of treating fabrics for use as liners upon surfaces of unvulcanized rubber which comprises applying thereto a water emulsion of linseed oil and an agglutinant.

9. A method of treating fabrics for use as liners upon surfaces of unvulcanized rubber which comprises applying thereto an emulsion comprising linseed oil, casein and gasoline.

10. A method of treating fabrics for use as liners upon surfaces of unvulcanized rubber which comprises applying thereto an emulsion, comprising an agglutinant, linseed oil, gasoline and water.

11. A liner fabric for use upon surfaces of unvulcanized rubber which has been coated with a vegetable drying oil and an agglutinant.

12. A liner fabric for use upon surfaces of unvulcanized rubber that has been coated with an emulsion of casein and a plasticizing oil.

13. A liner fabric for use upon surfaces of unvulcanized rubber that has been coated with an emulsion of a vegetable drying oil, casein and water.

14. A liner fabric for use upon surfaces of unvulcanized rubber that has been coated with an emulsion of a vegetable drying oil, protein and gasoline.

15. A method of protecting the surfaces of unvulcanized rubber compound which comprises disposing thereon a sheet of liner material which is coated with a mixture of linseed oil and casein.

16. A method of protecting the surfaces of unvulcanized rubber compounds which comprises disposing thereon a sheet of liner fabric which has been coated with a mixture of casein, linseed oil and gasoline.

17. A liner for use upon unvulcanized rubber comprising a coated fabric in which the coating consists of the following materials in approximately the proportions given:

| | Per cent |
|---|---|
| Boiled linseed oil | 18 |
| Gasoline | 18 |
| Casein | 7 |
| Water | 53 |
| Other ingredients | 4 |

18. A method of treating fabrics for use as liners upon unvulcanized rubber which comprises applying thereto a composition consisting, in approximately the proportions given, of the following:

| | Per cent |
|---|---|
| Boiled linseed oil | 18 |
| Gasoline | 18 |
| Casein | 7 |
| Water | 53 |
| Other ingredients | 4 |

In witness whereof, I have hereunto signed my name.

Signed at Akron, in the county of Summit and State of Ohio, U. S. A., this 14th day of February, 1930.

WILLIAM D. WOLFE.